United States Patent [19]

Nakao

[11] Patent Number: 4,608,114
[45] Date of Patent: Aug. 26, 1986

[54] SEAL TAPE STICKING DEVICE

[75] Inventor: Kouzo Nakao, Wakayama, Japan

[73] Assignee: Queen Light of Electronic Industries Ltd., Wakayama, Japan

[21] Appl. No.: 697,393

[22] Filed: Feb. 1, 1985

[30] Foreign Application Priority Data

May 15, 1984 [JP] Japan .................................. 59-071687

[51] Int. Cl.$^4$ ........................... B30B 3/04; B30B 15/34
[52] U.S. Cl. ................................ 156/497; 100/93 RP;
100/176; 156/499; 156/555; 156/583.1
[58] Field of Search ............... 156/555, 497, 499, 582,
156/583.1; 100/93 RP, 160, 176

[56] References Cited

U.S. PATENT DOCUMENTS

| 1,666,920 | 4/1928 | Von Webern | 156/497 |
| 3,124,504 | 3/1964 | Mahoney et al. | 100/93 RP |
| 3,530,027 | 9/1970 | Nuckols, Jr. | 156/555 |
| 3,843,483 | 10/1974 | Sendor et al. | 156/499 |
| 3,951,050 | 4/1976 | Poole | 156/497 |
| 3,962,016 | 6/1976 | Alfter et al. | 156/497 |

Primary Examiner—Michael Wityshyn
Attorney, Agent, or Firm—Steele, Gould & Fried

[57] ABSTRACT

A device for applying seal tape to sheet-like material, wherein an adhesive tape is fed together with a portion of the material in a feed direction and pressed between a pair of opposed rollers, comprising: a machine body; a fixed arm projecting substantially horizontally from the machine body; a common roller freely rotatably mounted at the distal end of the fixed arm, an operating position for other rollers being defined by operative engagement with the common roller, the material and the tape being pressed between rollers in the operating position; a first movable arm extending generally across the feed direction with a first positionable roller at the distal end thereof, the first movable arm being pivotally mounted for movement of the first roller between the operating position and a first stand-by position; a second movable arm arranged generally along the feed direction with a second positionable roller at the distal end thereof, the second movable arm being pivotally mounted on the machine body for movement of the second roller between the operating position and a second stand-by position; and, a power transmitting mechanism for alternately moving the first and second arms and the rollers thereon into and out of the operating position and their respective stand-by positions, the first and second arms remaining substantially fixed in orientation relative to the feed direction throughout their movement, and for rotatably driving each of the first and second rollers, whereby the seal tape can be applied to annular portions of the material when the first movable roller is in the operating position and can be applied to lengthwise positions of the material when the second movable roller is in the operating position.

10 Claims, 6 Drawing Figures

SEAL TAPE STICKING DEVICE

BACKGROUND OF THE INVENTION

The present invention relates to a seal tape sticking device for sticking a seal tape along the seamed part of a sewn article, for example, wet suits, used for diving and the like.

Generally, when sewing wet suits, etc., for instance, using a synthetic fiber sheet, a synthetic resin sheet or the like as the material, seal tapes are struck along the seams after the sewing operation, in order to prevent water leaks from these seamed parts and in order to reinforce them.

This operation is commonly performed by putting a seal tape along the seamed part of the material while heating and melting adhesives previously applied to the reverse side of the seal tape, and feeding the material and the tape between a roller made of rubber and a metallic roller made of iron, etc. and sticking the seal tape continuously along said seamed part or sewn part. Jets of hot air can be used to melt heat-soluble adhesives.

When sealing along the seamed part of the armhole part (namely, the part corresponding to the shoulder part, which is the part connecting the body trunk part with the sleeve part) etc., using this kind of device, for instance, it is necessary to seal the seam annularly in the circumferential direction of the sleeve part, unlike when sealing a comparatively large and flat part. Like a cylinder-type sewing machine in the category of sewing machines, a cylinderical part equipped with a processing part (pressurizing roller in this case) is necessary in the fore-end part.

When sealing the seamed part in the lengthwise direction of cylindrical portions, such as along the sleeve part, leg part, etc., it is necessary to provide the fore end part with a processing part (pressurizing part in this case), and an arm part arranged along the feeding direction of the material (like an arm-type sewing machine in the category of sewing machines) is needed in the fore-end part. Thus, it is necessary to use exclusive and different machines according to the type of the sealed part and seal, dividing the operating process. This naturally has hitherto compelled higher equipment cost and more operation processes.

SUMMARY OF THE INVENTION

The object of this invention is to provide a seal tape sticking device, which is so designed as to make it possible to seal continuously, and with the same device, the cylindrical seamed parts and the lengthwise seam parts of the sleeve part (arm part), leg part and armhole part, which is the seamed part of the body trunk part and the sleeve part.

This and other objects can be achieved by a device for applying seal tape to sheet-like material, wherein an adhesive tape is fed together with a portion of the material in a feed direction and pressed between a pair of opposed rollers, the device comprising: a machine body; a fixed arm projecting substantially horizontally from the machine body; a common roller freely rotatably mounted at the distal end of the fixed arm, an operating position for other rollers being defined by operative engagement with the common roller, the material and the tape being pressed between rollers in the operating position; a first movable arm extending generally across the feed direction and having a first positionable roller disposed at the distal end thereof, the first movable arm being pivotally mounted on the machine body for movement of the first roller between the operating position and a first stand-by position; a second movable arm arranged generally along the feed direction and having a second positionable roller disposed at the distal end thereof, the second movable arm being pivotally mounted on the machine body for movement of the second roller between the operating position and a second stand-by position; means for alternately moving the first and second arms to alternately move the first and second rollers into and out of the operating position and their respective stand-by positions, the first and second arms remaining substantially fixed in orientation relative to the feed direction throughout their alternating pivotal movements; and, means for rotatably driving each of the first and second rollers when disposed in the operating position, whereby the seal tape can be applied to annular portions of the material when the first movable roller is in the operating position and can be applied to lengthwise portions of the material when the second movable roller is in the operating position.

The first movable arm may comprise first and second parts, the first part pivotally mounted on the machine body for movement in a substantially vertical plane and the second part fixed to the distal end of the first part and extending generally across the feed direction, the first roller being disposed on the distal end of the second part, pivotal movement of the first part effecting movement of the first roller along an arcuate path between the operating position and a stand-by position located at a level above the common roller. In a preferred embodiment, the first movable arm comprises a rotatably mounted shaft, the first roller being fixed on one end of the shaft and a driven roller being fixed on the other end of the shaft, the rotatably driving means including a drive roller for driveably rotating the driven roller.

The second movable arm may comprise first and second parts, the first part rotatably mounted on the machine body and extending generally across the feed direction and the second part fixed to the distal end of the first part and extending generally along the feed direction, the second roller being disposed at the distal end of the second part, rotation of the first part effecting movement of the second roller along an arcuate path between the operating position and a stand-by position located at a level beneath the common roller.

The device may further comprise a nozzle having a guide member for directing a jet of hot air onto the seal tape immediately upstream of the common roller to melt adhesive on the tape without unduly heating the material, whereby thermal distortion of the material can be prevented.

In an alternative embodiment, the common roller is a metal roller and comprises heating means disposed in the roller for melting adhesive on the seal tape without heating the material sufficiently to damage the material.

DETAILED DESCRIPTION OF THE PREFERRED EMBODIMENTS

In the drawing, (1) is the box part of the body of this device containing various driving sources (such as the motor, air cylinder, etc.), power transmitting mechanism, etc., (2) is the arm projecting from said box part of the body (made in one piece therewith) in the horizontal direction, and (3) is the common roller provided at the distal end or fore-end part of said arm (2) in such a way that it can rise and fall.

This common roller (3) is freely-rotatably supported via the bracket (7) at the lower end of the shaft bar (6) and is rotated via the power transmitting mechanism (not shown in the drawing) arranged in the arm (2). The common roller (3) is made of iron and has a heater in it.

The cylinder part (10) and the arm part (11) are rotatably attached to body (1), and can be rotated within a prescribed angle by the driving sources, such as the air cylinder, etc. in the box part.

An arm (13) for the cylinder part (10) is attached to the fore-end or distal end part of the driving shaft (12). The fore-end part or distal end of arm (13) is attached the cylinder (14). Shaft (15) is disposed in cylinder (14). Pressurizing rollers (16) and (17) are fixed on the shaft and supported freely-rotatably by the shaft in the cylinder at opposite ends of the shaft. The pressurizing rollers (16) and (17) have peripheral parts formed of silicon rubber, etc. and one of the same diameter.

The pressurizing roller (16), as the first roller, pressably engages said common roller (3) selectively. The first roller can be reciprocated by the rotating operation of the arm (13) between the stand-by position shown by the 2-dot phantom line in FIG. 3 and the operating position where it pressably engages the common roller (3) (shown by the solid line). The angle of movement of arm (13) is shown by the accurate arrow A in the drawing.

The other pressurizing roller (17) pressably engages the driving roller (18), which projects from the side wall of the box part (1) of the body. Roller (18) is in the position where the pressurizing roller (16) pressably engages the common roller (3), and is rotated, being driven by said driving roller (18).

Cover (19) is disposed over the driving roller (18). Arm (13) is rotated by a driving source arranged in the box part (1) of the body, for example, an air cylinder, etc.

The arm (11) is attached to the end part of the cylindrical rotating shaft (20), which is made in one piece therewith and which projects in the horizontal direction from the side wall of the box part (1) of the body, intersecting perpendicularly with said rotational shaft (20) and in the direction of feeding the material.

Arm part (11), as the second roller, supports pressurizing roller (21) freely-rotatably on shaft (20) at its end part. Pressurizing roller (21) is rotated by the driving source arranged in the box part (1) of the body via the shaft (22), the timing belt (23), etc. provided in said rotating shaft (20).

Figure 3:
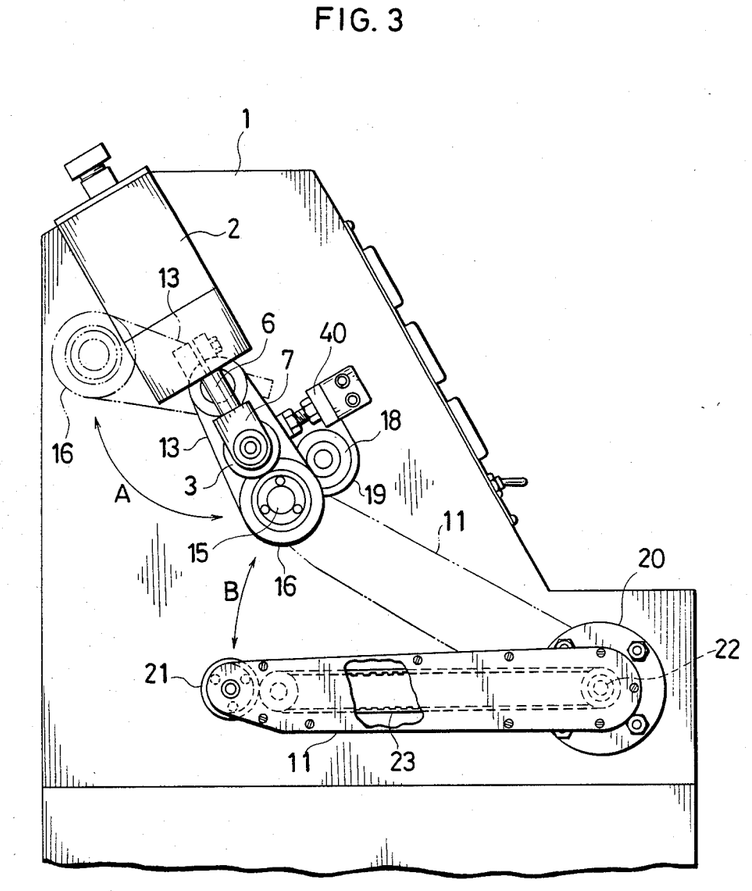
FIG.3 is a side elevation, in enlarged scale, and partly cut away, with positionable parts shown in phantom in one position.

Rotational shaft (20) is rotated within a prescribed angle by the air cylinder, etc. arranged in the box part (1) of the body, and the pressurizing roller (21) can be reciprocated, as shown by the arcuate arrow (B) in the drawing, between the lower stand-by position as shown by the solid line in FIG. 3 and the operating position where it pressably engages the common roller (3) as shown by the 2-dot phantom line.

Figure 1:
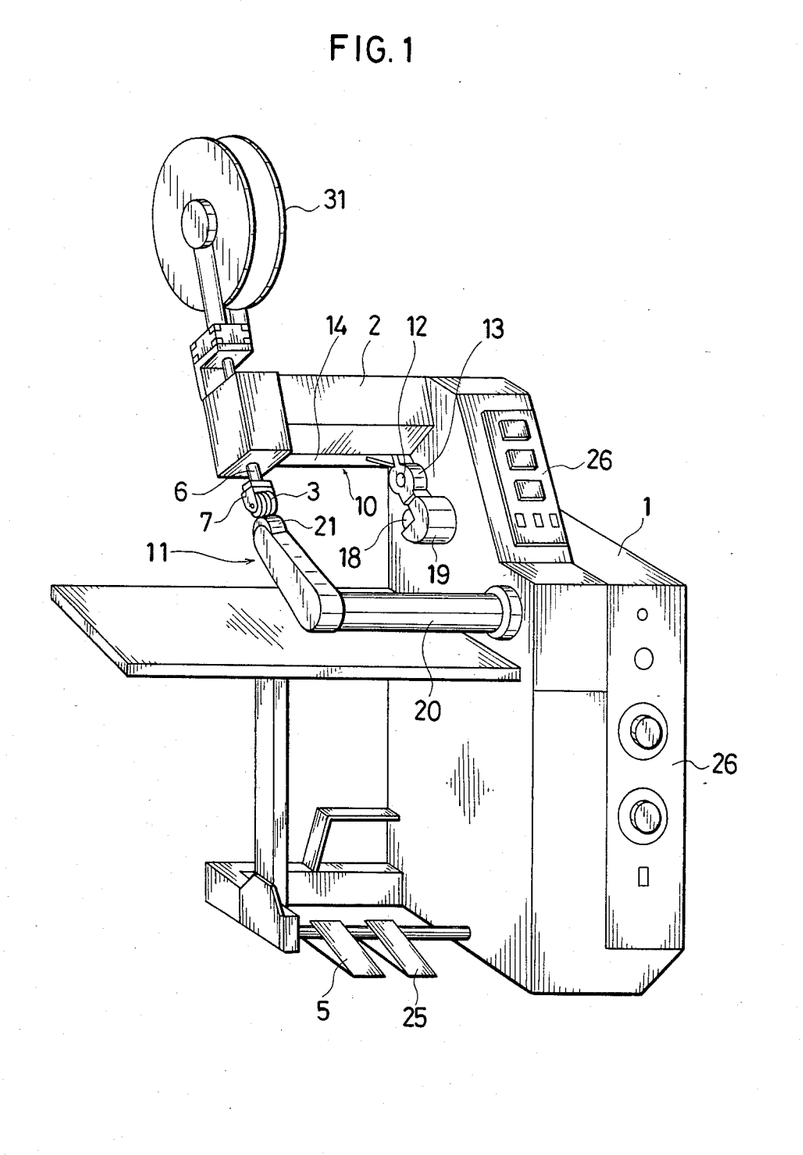
FIG.1 shows one preferred embodiment of this invention, and is a perspective view showing the condition of sealing along the seamed part in the lengthwise direction of the cylindrical parts, such as the sleeve part and the leg part.
Figure 2:
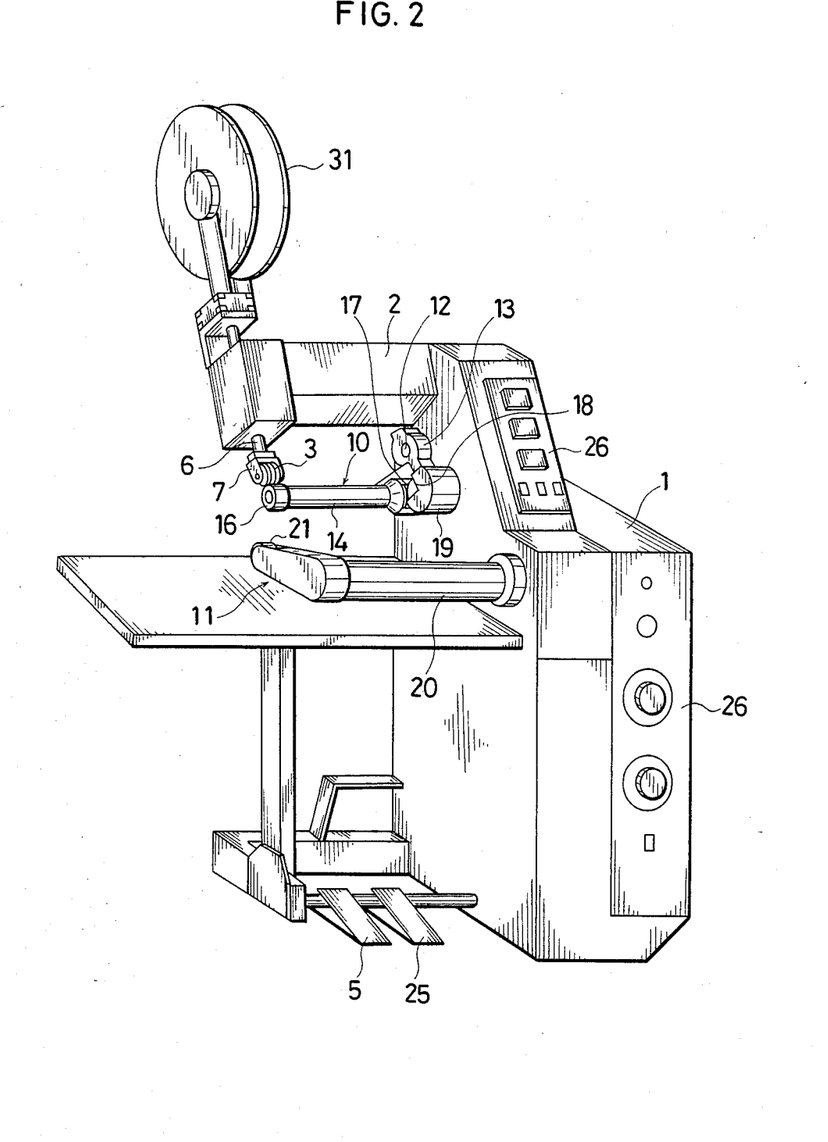
FIG.2 is a perspective view showing the condition of sealing the annular parts, such as the armhole part.

The cylindrical part (10) and the arm part (11) are operated simultaneously by the change-over action of the change-over switch provided in the pedal (25) or the operation panel (26). When sealing the cylindrical material of the armhole part, etc. in the circumferential position, the machine is changed to the condition as shown in FIG. 2, and when sealing in the lengthwise direction of the cylindrical parts, such as the sleeve part, crotch part, etc. the machine is changed to the condition as shown in FIG. 1.

A supply of seal tape (32), preferably synthetic resin tape, is stored on a reel (31), and fed between common roller (3) and either of pressuring rollers (16) or (21), depending upon the operating arrangement. A heat soluble adhesive is applied to one side of the tape. A hot-air jetting nozzle (30) is provided at the front of the fore-end part or distal end of the arm (2). This hot air jetting nozzle (30) directs jets of hot air to the adhesive applied to the seal tape, to heat and melt the adhesive immediately before the heat adhesive tape (32) is fed between the common roller (3) and the pressurizing rollers (16) or (21). The hot air is preferably directed to the side of the tape opposite the adhesive to avoid damaging the material.

Figure 4:
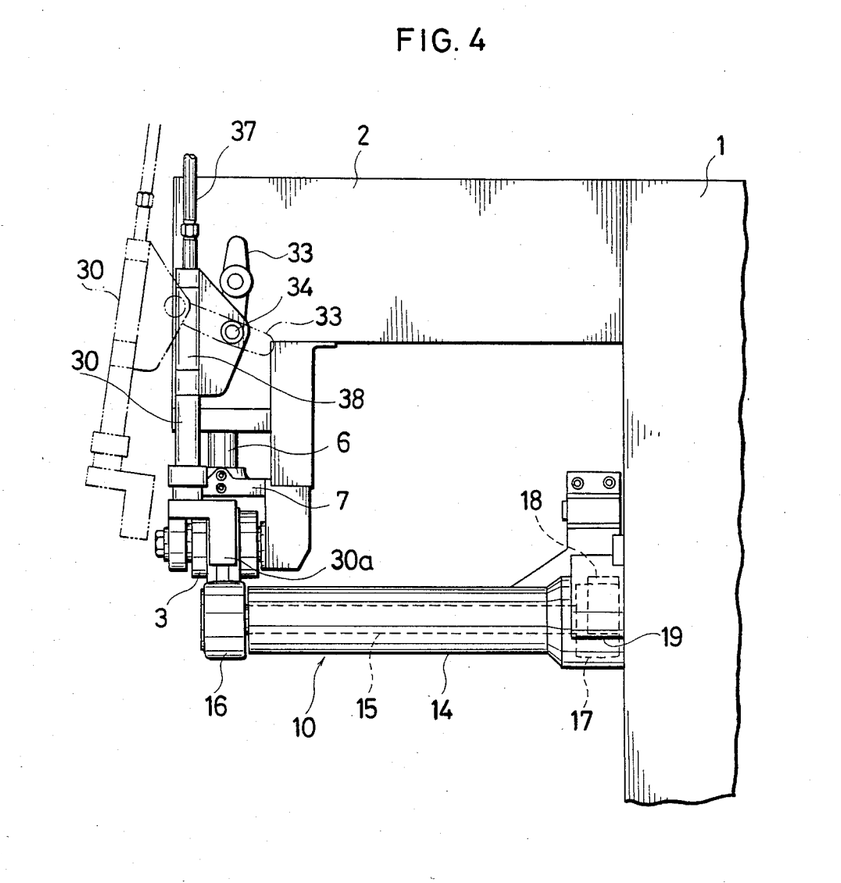
FIG.4 is a front view, partly in phantom showing attachment of the hot air jetting nozzle.
Figure 5:
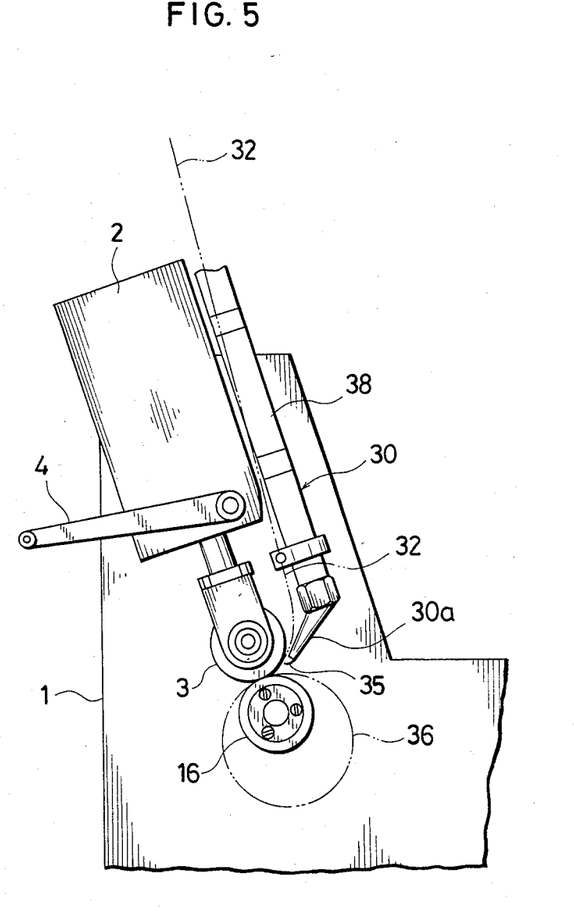
FIG.5 is a side view, in enlarged scale, showing attachment of the hot air jetting nozzle.

This hot-air jetting nozzle (30) is freely-rotatably pivotally attached via the pin (34) to one end of the rotational arm (33) provided in the front of the fore-end part of the arm (2). The nozzle (30) may be moved by rotation of the rotational arm (33), between an obliquely upward stand-by position shown by the 2-dot phantom line in FIG. 4 and the operating position shown by the solid line. The fore-end part (30a) of this hot air jetting nozzle (30) is arranged in the position immediately before that in which the common roller (3) and one the pressurizing rollers (16) or (21) rollingly contact each other, as shown in FIG. 5.

A guide member (35) having a curved guide surface is attached to the free end of nozzle (30), and hot air jetted from the fore-end part of the hot-air jetting nozzle (30) is directed to the side of the thermally adhesive tape (32), and not to the side of the material (36). If hot air from the hot air jetting nozzle (30) strikes directly on the material, the material itself expands or contracts locally, causing creases.

Compressed air is supplied to the mouthpiece part (37) at the upper end of said hot-air jetting nozzle (30), and this compressed air is heated to the required temperature by the heating part (38) containing a heater for the air.

Stop member (40) controls and limits the rotational position of the cylindrical part (10).

According to such a structure, when first sealing along the circumferential direction of a cylindrical material of the armhole part, etc., the cylindrical part (10) is moved into the position, and the arm part (11) is moved into the stand-by position, operating as shown in FIG. 2.

Figure 6:
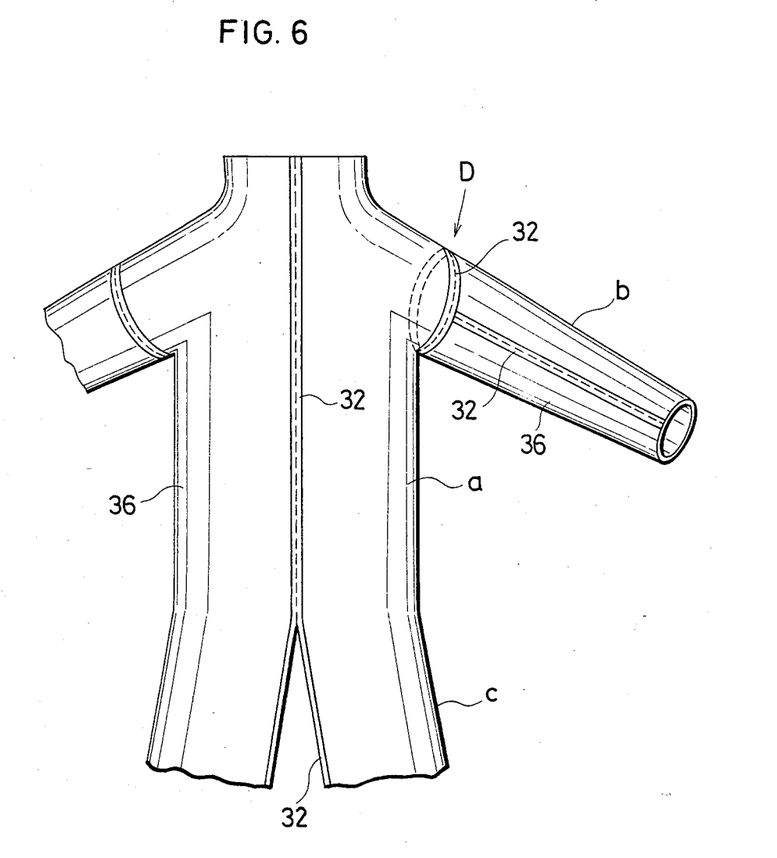
FIG.6 is a schematic drawing showing the seams to be sealed in a processed article.

Thus, when the seamed part of the material (36), together with the thermally-adhesive tape (32), is fed between the common roller (3) and the pressurizing roller (16) as shown in FIG. 5, continuous sealing can be performed as shown by the part D in FIG. 6.

When sealing along the seamed part in the lengthwise direction of the sleeve part b or the leg part c, the cylindrical part (10) is moved into the stand-by position and the arm part is moved into the operating position, as shown in FIG. 1.

Here, in order to insert the cylindrical material (36) into the arm part (11), the common roller (3) is made to stand by in the upper part by operating the lever (4) or the pedal (5), and opening a gap between the common roller (3) and the pressurizing roller (21). The cylindrical material (36) is put in to this side of the arm part (11), and the material (36) and the thermally-adhesive tape (32) are fed between the common roller (3) and the pressurizing roller (21), adding the thermally-adhesive tape (32) to the seamed part of the material (36) and lowering the common roller (3) again.

Thus, while the cylindrical material (36) is being fed to the place behind the rollers (3) and (21), the thermally-adhesive tape (32) is adhered continuously along the seamed part.

When sealing the seamed part of a large and flat part, such as a body trunk (a), etc., it is possible to seal continuously by moving the cylindrical part (10) and the arm part (11) to the positions shown in FIG. 2.

Therefore, by this invention, even sealing of the annular parts, such as the armhole part, etc. or sealing along the lengthwise direction of the cylindrical material of the sleeve part, leg part, etc. can be accomplished continuously with a single device by alternately moving the cylindrical part and the arm part into the operating position. It is unnecessary to use a separate machine exclusively and perform a separate process for each kind of sealing, as has hitherto been necessary. Accordingly, equipment cost and manufacturing cost can be substantially reduced.

What is claimed is:

1. A device for applying seal tape to sheet-like material, wherein an adhesive tape is fed together with a portion of the material in a feed direction and pressed between a pair of opposed rollers, the device comprising:

a machine body;

a fixed arm projecting substantially horizontally from the machine body;

a common roller freely rotatably mounted at the distal end of the fixed arm, an operating position for other rollers being defined by operative engagement with the common roller, the material and the tape being pressed between rollers in the operating position;

a first movable arm extending generally across the feed direction and having a first positionable roller disposed at the distal end thereof, the first movable arm being pivotally mounted on the machine body for movement of the first roller between the operating position and a first stand-by position;

a second movable arm arranged generally along the feed direction and having a second positionable roller disposed at the distal end thereof, the second movable arm being pivotally mounted on the machine body for movement of the second roller between the operating position and a second stand-by position;

means for alternately moving the first and second arms to alternately move the first and second rollers into and out of the operating position and their respective stand-by positions, the first and second arms remaining substantially fixed in orientation relative to the feed direction throughout their alternating pivotal movement; and, means for rotatably driving each of the first and second rollers when disposed in the operating position, whereby the seal tape can be applied to annular portions of the material when the first movable roller is in the operating position and can be applied to lengthwise portions of the material when the second movable roller is in the operating position.

2. The device of claim 1, wherein the second movable arm comprises first and second parts, the first part rotatably mounted on the machine body and extending generally across the feed direction and the second part fixed to the distal end of the first part and extending generally along the feed direction, the second roller being disposed at the distal end of the second part, rotation of the first part effecting movement of the second roller along an arcuate path between the operating position and a stand-by position located at a level beneath the common roller.

3. The device of claim 2, further comprising a nozzle having a guide member for directing a jet of hot air onto the seal tape immediately upstream of the common roller to melt adhesive on the tape without unduly heating the material whereby thermal distortion of the material can be prevented.

4. The device of claim 1, wherein the first movable arm comprises first and second parts, the first part pivotally mounted on the machine body for movement in a substantially vertical plane and the second part fixed to the distal end of the first part and extending generally across the feed direction, the first roller being disposed on the distal end of the second part, pivotal movement of the first part effecting movement of the first roller along an arcuate path between the operating position and a stand-by position located at a level above the common roller.

5. The device of claim 4, further comprising a nozzle having a guide member for directing a jet of hot air onto the seal tape immediately upstream of the common roller to melt adhesive on the tape without unduly heating the material, whereby thermal distortion of the material can be prevented.

6. The device of claim 1, wherein the first movable arm comprises respective first and second parts, the first part pivotally mounted on the machine body for movement in a substantially vertical plane and the second part fixed to the distal end of the first part and extending generally across the feed direction, the first roller being disposed on the distal end of the second part, pivotal movement of the first part effecting movement of the first roller along an arcuate path between the operating position and a stand-by position located at a level above the common roller; and, wherein the second movable arm comprises respective first and second parts, the first part rotatably mounted on the machine body and extending generally across the feed direction and the second part fixed to the distal end of the first part and extending generally along the feed direction, the second roller being disposed at the distal end of the second part, rotation of the first part effecting movement of the second roller along an arcuate path between the operating position and a stand-by position located at a level beneath the common roller.

7. The device of claim 6, further comprising a nozzle having a guide member for directing a jet of hot air onto the seal tape immediately upstream of the common roller to melt adhesive on the tape without unduly heating the material, whereby thermal distortion of the material can be prevented.

8. The device of claim 1, further comprising a nozzle having a guide member for directing a jet of hot air onto the seal tape immediately upstream of the common roller to melt adhesive on the tape without unduly heating the material, whereby thermal distortion of the material can be prevented.

9. The device of claim 1, wherein the first movable arm comprises a rotatably mounted shaft, the first roller being fixed on one end of the shaft and a driven roller being fixed on the other end of the shaft, the rotatably driving means including a drive roller for driveably rotating the driven roller.

10. The device of claim 1, wherein the common roller is a metal roller and comprises heating means disposed in the roller for melting adhesive on the seal tape without heating the material sufficiently to damage the material.

* * * * *